United States Patent [19]

Wilhelm

[11] Patent Number: 4,813,312
[45] Date of Patent: Mar. 21, 1989

[54] POWER-WRENCH, A BOILING SPINDLE AND AN OPERATIONAL METHOD

[76] Inventor: Raimund Wilhelm, Kellersteige 25, D-7080 Aalen-Unterkochen, Fed. Rep. of Germany

[21] Appl. No.: 44,777
[22] Filed: May 1, 1987
[30] Foreign Application Priority Data Jun. 14, 1986 [DE] Fed. Rep. of Germany ....... 3620137

[51] Int. Cl.$^4$ ............................................ B25B 23/14
[52] U.S. Cl. ....................................... 81/467; 81/469; 173/6; 173/11
[58] Field of Search ................... 81/52, 429, 467, 469, 81/470; 173/6, 11, 12

[56] References Cited

U.S. PATENT DOCUMENTS

| | | | |
|---|---|---|---|
| 3,965,778 | 6/1976 | Aspers et al. | 81/469 |
| 3,974,685 | 8/1976 | Walker | 173/12 X |
| 4,162,639 | 7/1979 | Gill | 81/470 X |
| 4,515,045 | 5/1985 | Gnatchenko et al. | 81/429 |
| 4,617,843 | 10/1986 | Nishida et al. | 81/429 X |
| 4,685,050 | 8/1987 | Polzer et al. | 81/467 X |

FOREIGN PATENT DOCUMENTS

| | | | |
|---|---|---|---|
| 100023 | 2/1984 | European Pat. Off. | 81/429 |
| 169736 | 9/1984 | Japan | 81/429 |

Primary Examiner—James G. Smith
Attorney, Agent, or Firm—Gilbert L. Wells

[57] ABSTRACT

A power-wrench bolting spindle (1) is used to insert and tighten screws or nuts. The bolting spindle is driven at one end by a motor through a reduction gear (5) and at its other end a bolting tool is seated. A torque sensor (7) is mounted between the motor and the spindle. During bolting, other essential data besides the bolting torque are ascertained. The bolting spindle is equipped with a depth sensor (24) connected to the regulating circuit to measure the depth of bolting. An angular-speed sensor is connected to the regulating circuit and measures the motor or spindle angular speed. The bolting procedure is carried out in two operational stages separated by a pause, namely an application stage (L) and a tightening stage (Z). Each of these operational stages terminates when a specific shutdown bolting torque is reached. Due to the control by the depth sensor, the bolting angular speed is lowered from its initial value when approaching the application stage to a final value which, when the shutdown bolting torque is reached, allows stopping without overloading.

14 Claims, 3 Drawing Sheets

POWER-WRENCH, A BOILING SPINDLE AND AN OPERATIONAL METHOD

CROSS-REFERENCE TO A RELATED APPLICATION

Applicant claims priority under 35 USC 119 for application No. P 36 20 137 filed June 14, 1986 in West Germany.

BACKGROUND OF THE INVENTION

The invention is the first place concerns a power-wrench bolting spindle having a drive shaft and an output shaft which is axially displaceable with respect to the drive shaft against a spring force.

Power-wrenches of this kind are used in power-assembly, for instance in the automobile industry. Illustrative applications are the bolting of an engine block to the supporting vehicle parts, the bolting of the cylinder head cover, and the screwing-together of the components of the connecting rod bearings.

The constant measurement of the depth of bolting is desirable to effectively regulate a bolting procedure. Using a depth sensor, it is possible to decrease the angular speed during the application stage shortly before there is contact between the screw head or nut and the base, whereby the application stage can be terminated with high accuracy when the predetermined applied torque is reached. An accuracy of 1% in the torque is desired.

Depth measurement serves another check: if the screw bore is too shallow or if the thread does not penetrate deeply enough (both being considered a "blind hole"), or if a foreign body is in the bore, then the depth check ascertains simultaneously with the torque verification that while the properly applied torque has been achieved, the required bolting depth has not, and an error signal is emitted.

West German Published Application No. 29 30 430 discloses a bolting spindle of the stated kind. It is equipped with a magnetic sensor (54) detecting the angular position of the drive shaft (26). A bolt is screwed in until its head makes contact with the surface of the associated workpiece. In the course of a second stage, the screw is tightened at a predetermined torque while the angular-position sensor keeps monitoring.

The known bolting spindle does not allow direct depth measurement. Rather, the screw-depth must be computed from the number of revolutions based on the pitch. This entails therefore pre-knowledge of pitch parameters.

SUMMARY OF THE INVENTION

An object of the present invention is to create a power-wrench bolting spindle for which the depth of bolting *itself* shall be constantly measured during operation.

This object is achieved by a power-wrench bolting spindle having a drive shaft and an output shaft which is axially displaceable with respect to the drive shaft against a spring force wherein a depth sensor measures the depth of bolting. The transmitting end of the drive shaft delivering the torque is supported in an axially displaceable manner within the receiving end of the output shaft receiving the torque and a coil is mounted within a case (sleeve) of the bolting spindle enclosing at least part of the transmitting end and of the receiving end, the receiving end being displaceable within the coil while concurrently charging its inductance.

In the present invention, the spindle is equipped with a depth sensor generating signals concerning the particular bolting depth and/or the still present distance between the screw head or nut and the base while the bolting procedure goes on, where these signals are fed to a regulating circuit. Accordingly, the absolute bolting depth is measured independently of the number of revolutions performed by the spindle, of the pitch and of the time since bolting began.

FURTHER EMBODIMENTS OF THE INVENTION

A further embodiment of the present invention concerns a power-wrench. This power-wrench has, in addition to the elements disclosed above, two or more length-measuring instruments mounted to a base plate to which the bolting spindle is assembled and positioned on two or more sides of the bolting spindle. The length-measuring instruments are parallel to the depth sensor and measure the distance(s) between the base plate and any workpiece on which the bolting process is being carried out.

When the bolting spindle disclosed above is used, the power-wrench of this second embodiment permits using furthermore length-measuring instruments which ascertain whether a brought-up workpiece, for instance an engine block, assumes relative to an assemlby plate holding the bolting spindle a position within admissible tolerances, or whether it is askew or too close or too far away.

In automobile assembly lines, and depending on the delivery programs, engines with cylinder blocks and/or heads made of steel and of aluminum must be processed sequentially, the same power-wrenches and spindles being required. Depending on the material, the bolts must be tightened with different tightening torques. This requires the operator to reset the power-wrenches to the particular torques required. Besides the torques, however, other data such as the reduction in the reduction gear, the maximum motor speed and the angular resolution must be known.

One of the essential factors for bolting steel or aluminum is the motor speed because different frictions are evinced by these two materials. The surface of steel is substantively rougher and, therefore, lesser rotational speeds must be used with steel than for aluminum to avoid heat generation and the above stated cold-welds. On the other hand, aluminum should be bolted at the permissible higher rotational speed to save time.

The particular information required for a particular bolting procedure are contained in data sheets. The proper data sheets are selected and the data are fed-in by hand whereby, aside the labor involved, the risk of wrong inputs is incurred and hence the danger of poor (too loose and welded) boltings arises.

Moreover, externally similar bolting spindles may have different reduction gears that are not always clearly marked on them.

In a third embodiment of the present invention, the power-wrench has:
 (a) a motor, especially with a reduction gear,
 (b) a torque sensor mounted between the motor and the drive shaft for the spindle,
 (c) a regulating circuit for the bolting procedure, (d) an angular-speed sensor connected to the regulating circuit to measure the motor or spindle angular speed, (e) an electronic memory storing parameters of the bolting spindle, its drive and of the sensors, and mounted within the power-wrench, in particular in the bolting spindle, and (f) the memory is connected through the torque sensor to the regulating circuit.

Also, both the bolting torque and the angular speed of bolting shall be sensed when using a bolting spindle as described in the first embodiment. The three corresponding measured data then are used in the manner of a genuine regulation to control the bolting procedure so that, on the one hand, the bolting procedure is carried out in a very short time and, on the other hand, excessive friction and hence welds (cold welds) are reliably avoided between the parts bolted together.

By considering these permanently available test data, the bolting procedure is carried out in optimal fashion, the screw or nut being tightened up to the desired tightening torque and the bolting being carried out in shortest possible time, and this without damage.

The bolting procedure is carried out in two stages, first in an application stage terminating when the screw head or nut touches its base, and after a pause, the tightening stage, wherein the bolting proceeds until a predetermined tightening torque is reached.

Different bolting spindles are used in different bolting procedures (different materials of the parts to be bolted together and different bolt lengths and thicknesses). Each bolting spindle after it is assembled is connected to the regulating circuit that receives in some manner the parameters of the bolting spindle and of its drive. In order that this process circumvent manual intervention, which would be time-consuming, an electronic memory as disclsed in the third embodiment is provided, which is housed in the very bolting spindle and which during tightening feeds the required setting data to the regulation circuit.

According to a fourth embodiment:
(a) the torque sensor comprises two, or especially four strain gauges connected as a bridge circuit,
(b) the magnitude of the electrical resistance of one of the bridge arms is arbitrarily variable by means of an electronic switch (transistor), in particular by placing a fixed resistor in parallel, so that a control signal generated by the bridge and fed to the regulating circuit for the purpose of transmitting setting data is changed thereby, and
(c) a pulse train drives the electronic switch and is obtained from the memory component reacting to the clock pulses fed to it.

The electronic memory storing the paramters of the bolting spindle, of its drive and of the sensor automatically emits a pulse train to the regulation circuit when a bolting spindle is applied through the torque sensor of the bolting spindle, whereby all required parameters are fed into the regulation circuit which is then adapted to the bolting spindle.

The present invention also concerns a procedure for operating the bolting machine.

In a fifth embodiment, the bolting procedure is carried out in two stages separated by a pause, namely the application stage and the tightening stage, each stage being terminated if desired when a particular shutdown value is reached, namely a specific torque or a specific motor current. In this manner, it is possible during the application stage to reduce the bolting angular speed in the course of depth testing as the application stage is being approached to an admissible final value so as to permit shutdown without endangering the bolted parts.

This fifth embodiment comprises a method for operating the power-wrench of embodiment three wherein the bolting method is carried out in two operational stages, the application stage and the tightening stage which are separated by a pause, each stage terminating when a shutdown bolting torque ($M_{AL}$, $M_{AZ}$) or a shutdown motor current ($I_{AL}$, $I_{AZ}$) that is predetermined for them is being reached. In the application stage, the bolting angular speed n is controlled by the depth sensor to be lowered from its initial value as it approaches the application condition wherein the screw head or the nut touches the base to a final value (shutdown bolting angular speed $n_{AL}$) which causes, upon reaching the shutdown bolting torque ($M_{AL}$) or the shutdown motor current ($I_{AL}$), the power-wrench to stop while averting overloading.

According to embodiment six, the particular bolting angular speed n is regulated by the formula below while the particular bolting torque M is continuously measured:

$$n = n_{max} - [n_{max} - n_{min}] \times M/M_A,$$

where $n_{max}$ is the maximum bolting angular speed in the application or the tightening stage, $n_{min}$ is the minimum bolting angular speed in the application or the tightening stage, and $M_A$ is the shutdown bolting torque at the end of the application or the tightening stage.

In the sixth embodiment, the bolting angular speed n is controlled in very simple manner in both stages as a function of the particular bolting torque measured, the simple formula of this function reducing the angular speed as the bolting torque increases. As a result, the above described damage in the application or tightening are reliably excluded.

In a seventh embodiment, the particular bolting angular speed n is regulated by the formula below while the particular motor current (actual motor current) is being continuously measured:

$$n = n_{max} - [n_{max} - n_{min}] \times I/I_A,$$

where $n_{max}$ is the maximum bolting angular speed in the application or the tightening stage, $n_{min}$ is the minimum bolting angular speed in the application or the tightening stage, and $I_A$ is the shutdown motor current at the end of the application or the tightening stage. According to this embodiment, the regulation criterion is the actual motor current I in lieu of the bolting torque.

BRIEF DESCRIPTION OF THE DRAWINGS

Illustrative embodiments with further features of the invention are described below in relation to the drawings, wherein.

DESCRIPTION OF THE PREFERRED EMBODIMENTS

Figure 1:
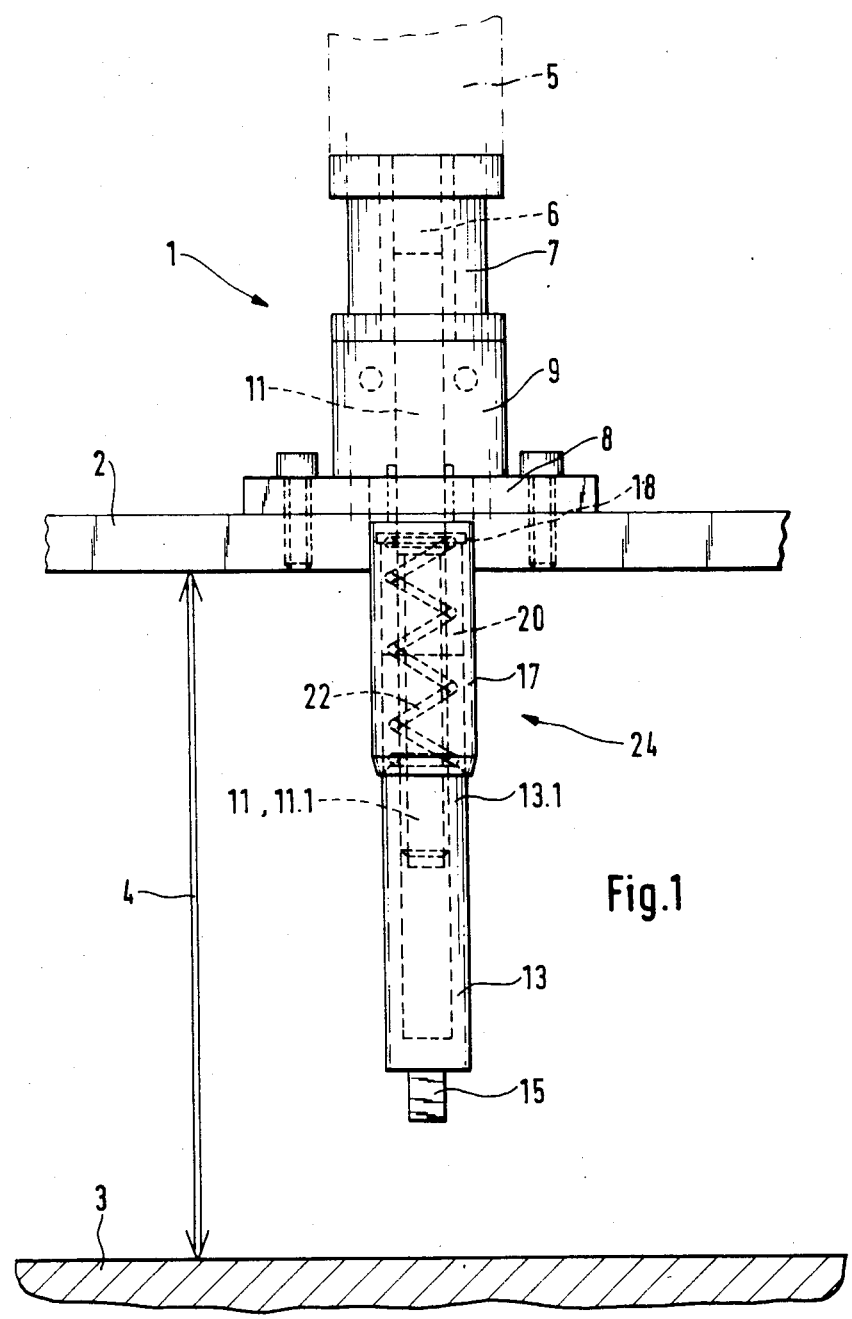
FIG. 1 is a side view of a bolting spindle of the invention.

FIG. 1 shows an embodiment of a bolting spindle 1 fastened to an assembly plate 2 together with which it is displaced vertically relative to a workpiece 3, for instance the cylinder head cover of an engine block.

A conventional length-measuring instrument 4 (indicated only schematically) acting as a depth sensor and ascertaining the distance between the assembly plate 2 and the surface of the workpiece 3 is located between components 2 and 3. The depth sensor may operate purely mechanically or it may employ wave mechanisms such as radar or ultrasonics. Preferably three such length sensors 4 are mounted circumferentially around the axis of the bolting spindle 1 and are apart from each other by 120°. Thereby, it is possible to determine both the distance between the assembly plate and the workpiece on the one hand and any obliqueness of the workpiece. These data are essential in the continuous depth measurement by the bolting spindle 1 itself.

In this case, the bolting spindle 1 is driven by a brushless motor and a reduction gear 5 indicated merely schematically and partially. The reduction gear has a constant reduction gear and therefore cannot be switched to a deviating output angular speed. A specific motor and a specific reduction gear are provided for each bolting spindle. Both are selected to fit the screw or nut diameter. The drive shaft 6 of the reduction gear is irrotationally connected to the input of a torque sensor 7 which typically is also designated as "load cell" "load flange." The torque sensor measures the torque transmitted in the bolting procedure from the motor to the bolting spindle and the screw or nut.

One flange 8 fixed the bolting spindle to the assembly plate 2 which illustratively is moved into the operational position by a pivot arm. The flange 8 supports a bearing case 9 within which the bolting spindle drive shaft 11 rests on rotational manner. Underneath the flange 8, the drive shaft is provided with axially parallel grooves and ribs; this drive shaft supports an axially displaceable tubular output shaft 13 with similar grooves and ribs. The end of the output shaft 13 receiving the torque, i.e., the receiving end 13.1 therefore is slipped in the manner of a multiple spline shaft over the torque transmitting end, namely the transmitter end 11.1 of the drive shaft 11. The output shaft is closed at the bottom and holds a square 15 or the like to slip on a bolting tool, especially a wrench element (socket) which then is plugged on the screw head or nut (wrench element, screw head or nut are omitted).

A protective sleeve 17 projects downward from the flange 8 and is screwed, i.e., detachably fastened to a threaded stub of the flange 8. The protective sleeve contains a coil 20. The hollow output shaft 13 is made of a ferromagnetic material, in particular tool steel, and represents a coil core. The coil 20 is surrounded by a helical spring 22 which loads the output shaft downward from the protective sleeve 17 (as far as a stop, now shown). In this manner, a depth sensor is formed which is denoted as a unit by 24. In the position shown, the output shaft 13 penetrates by about half into the coil 20 and thereby forms a certain coil inductivity. By changing the depth of penetration (i.e., by forcing the output shaft 13 up or down), the inductivity of the coil also will change.

Conductors omitted from FIG. 1 feed the resultant test data, namely the coil inductivity, as parameters of bolting depth, and the torque, continuously to a regulation circuit (omitted).

Figure 2:
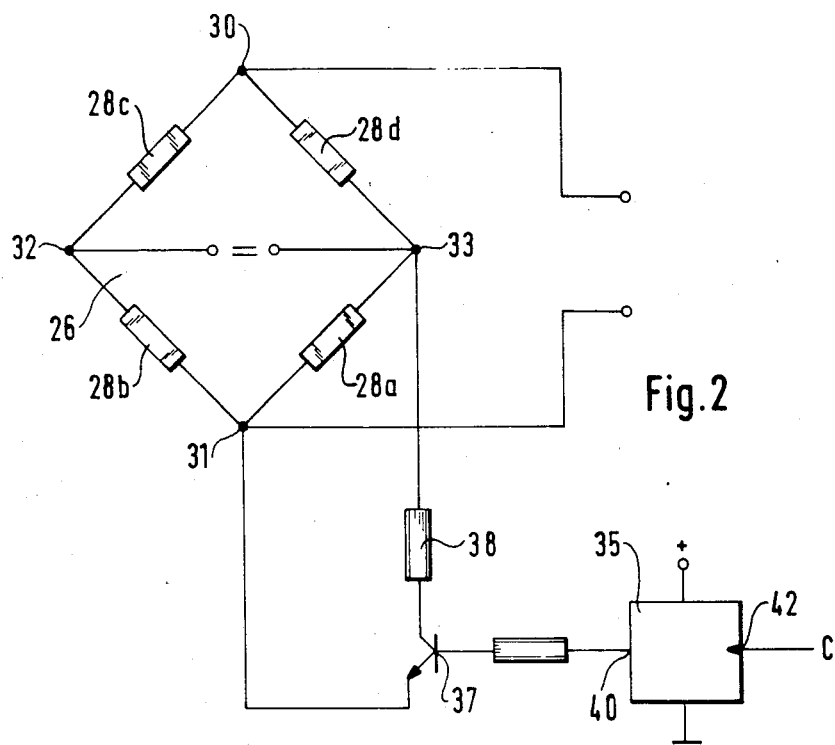
FIG. 2 shows a circuit diagram with a memory, used for storing setting data in the regulating circuit.

FIG. 2 is a block circuit diagram of a bridge 26 consisting of four strain gauges 28a through 28d. The strain gauges are mounted in the torque sensor 7 so that their effects are mutually reinforcing because each time two gauges wired for tension and two wired for compression will be loaded. In lieu of using four strain gauges, it is possible to make use only of two gauges and two fixed resistors. Points 32 and 33 of the bridge are at a DC supply voltage. Points 30 and 31 are the bridge output from which is emitted a control signal to the regulating circuit (omitted). To the extend described so far, this circuit acts to transmit the particular torque value to the regulating circuit.

Moreover, the circuit transmits parameters required for the initial setting of the regulating circuit relative to the particular bolting spindle and its drive.

All the required parameters are stored in memory 35 which, in particular, is a semiconducting memory. This memory is a programmable and read-out semiconducting memory. The information it contains is read out in serial data transmission.

A resistor 38 is in parallel with the strain gauge 28a by means of an electronic switch 37 (here an NPN transistor). The transistor base is connected to the output 40 of the memory component 35. This memory component has a clock input 42.

Figure 3:
FIG. 3 is a time plot of a clock input signal to the memory.
Figure 4:
FIG. 4 is a plot of a typical output signal from the memory.

FIG. 3 shows a time sequence of clock signals fed to the clock input 42. In relation to the data stored in the memory 35, a pulse train appears at its output 40 and is illustratively shown in FIG. 4. Depending on the signals at the output 40 and hence at the collector of the transistor 37, the resistor 38 is alternatingly switched in parallel with the strain gauge 28a and taken out of the circuit. Accordingly, the bridge is detuned in relation to the output signals from the memory component. Thereby, the torque signal emitted by the bridge due to the clock signals receives a superposition of a sequence of signals containing the essential parameter information.

The following parameters may be stored in the memory component 35 for a specific power-wrench equipped with a particular torque sensor, a particular motor and reduction gear:

motor: maximum angular speed and maximum current
  gear unit: gear reduction ratio
  torque sensor: rating in Nm
  (load cell); sensitivity in mv/v
  depth sensor: depth in mm/v
  bolting spindle: overall efficiency: ratio of output to input power.

The regulating circuit computes the following values read from the memory component for later use in regulating the bolting procedures:

Maximum angular speed of the output shaft as a ratio of the maximum motor speed to the reduction factor of the reduction gear;
  Angular resolution as pulse/degree of the commutation of the brushless motor multiplied by the gear rotation ratio;
  The efficiency W.

The commutation pulses are directly fed from the motor. Illustratively, their resolution is 7.5°/pulse.

The efficiency W is monitored during bolting, that is, the ratio of the output to input power given by $$W = P_{out}/P_{in}$$

where $P_{in} = UI$, namely the product of the current drain in the motor and its input voltage.

The output power is a function f of the particular bolting torque and of the particular bolting (angular) speed namely $$P_{out} = f(Mn)$$

When, now during bolting the efficiency W drops below the value predetermined by formula 1, the reason will be increased friction in the power-wrench bearings with the possibility of its malfunctioning. An alarm signal is then generated.

A signal sequence containing these parameters then is transmitted to the regulating circuit but only at the beginning, that is after installation of the power-wrench and upon inquiry from the regulating circuit. The parameters stored in the regulating circuit then are the basis for regulating the power-wrench in all similar bolting procedures.

When the bolting spindle is exchanged and/or the data for the bolting procedure are modified, for instance in relation to material, length and diameter of the screw or nut, the pertinent additional data must be fed in, which however, are absent from the memory. The memory is housed in the bolting spindle itself and contains only the typical parameters for this bolting spindle and its drive.

Figure 5:
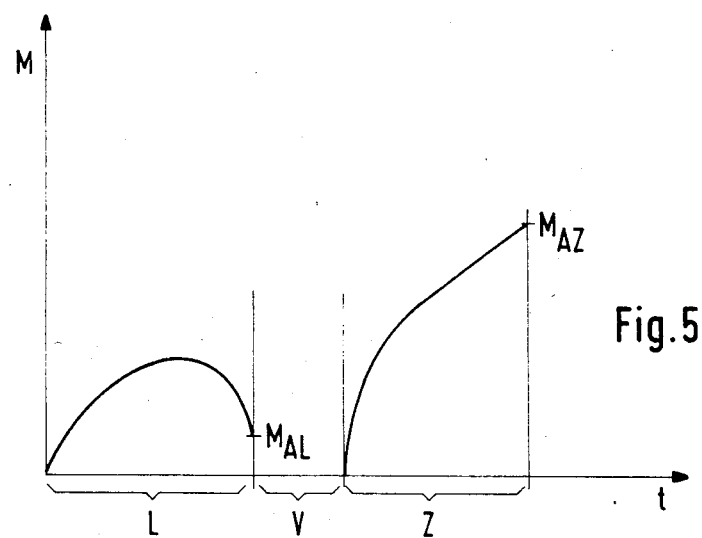
FIG. 5 is the time plot of bolting torque M during the application and during the tightening stages.
Figure 6:
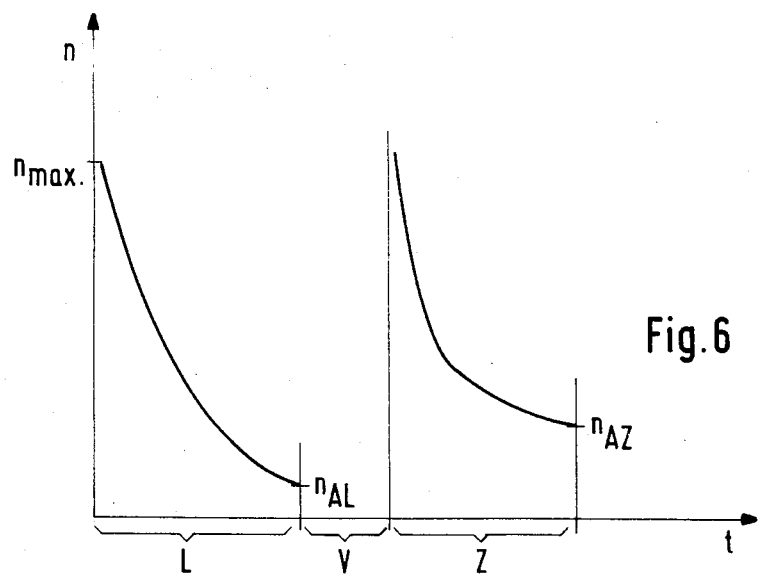
FIG. 6 shows the corresponding motor angular speed n.

FIGS. 5 and 6 shows the time function of the bolting torque M and of the angular speed n for a typical bolting procedure. As already mentioned, this bolting procedure is carried out in two time frames, the application stage L and the tightening stage Z, which are separated by a pause V.

The application stage begins with a maximum angular speed $n_{max}$ and an initialy increasing bolting toruqe M. While the (illustratively) screw is being turned, the output shaft 13 loaded by the helical spring 22 (FIG. 1) moves down relative to the protective sleeve 17, whereby the coil inductivity drops. The coil-emitted signal is converted into a measure of bolting depth and is compared with a previously set limit value of the bolting depth. This limit value corresponds to the screw head or nut touching the base. Due to the depth signal, the bolting torque M is raised by the regulating circuit so that at the end of the application stage L this torque assumes a value $M_{AL}$. Perforce the angular speed n also is lowered by the regulating circuit as given by the formula $$n = n_{max} - [n_{max} - n_{min}] \times M/M_A$$

where $n_{max}$ is the maximum bolting angular speed in the application or tightening stage, $n_{min}$ is the minimum bolting angular speed in the application or tightening stage, and $M_A$ is the shutdown bolting torque at the end of the application or tightening stage.

In simplified form, formula (3) is written as $$n = n_{max} - kM,$$

where k is a constant.

Accordingly, the angular speed n is lowered by the regulating circuit from its maximum value, decreasing as the torque increases, until reaching a limit value larger than zero.

Formula 1 applies both to the application stage L and the tightening stage Z. The value $M_A$ denotes that bolting torque which must be reached at the end of the application or tightening stage.

The application stage is followed by a pause to assure completion of this stage everytime when several screws or the like must be bolted. When a bolting cannot be carried out, for instance because a blind hole is present, then the entire bolting procedure is interrupted or, after a defect has been removed, for instance when removing a foreign body from the blind hole, the procedure is repeated for the screw and is continued for all in the tightening stage.

During a bolting procedure, the bolting torque is continuously ascertained and read into the regulating circuit. A shutdown bolting torque $M_A$ is preset both for the application and the tighenting stage. These shutdown bolting torques are low for the application stage and substantially higher for the tightening stage. The regulating circuit controls each continuously measured and stored bolting moment according to formula 3 so as to achieve the associated bolting angular speed.

As follows from formula 3 and is shown in FIG. 6, the angular speed does not go down to zero but rather to a trivial value $n_{AL}$ which cannot cause any mechanical damage but allows carrying out the bolting procedure within an optimally short time.

The tightening stage again begins with the maximium angular speed $n_{max}$. This angular speed again is lowered in relation to formula 3 to a final $n_{AZ}$. The bolting torque is raised to a predetermined final value $M_{AZ}$ obtained from the formula 3.

In both stages, the motor is shut down once the predetermined shutdown bolting torque $M_{AL}$ and $M_{AZ}$ has been reached.

In lieu of the bolting torque, the actual motor current I may be used as the regulation criterion for the bolting angular speed. The following formula of regulation then applies:

$$n = n_{max} - [n_{max} - n_{min}] \times I/I_A,$$

where $n_{max}$ is the maximum bolting angular speed in the application and tightening stages, $n_{min}$ is the minimum bolting angular speed in the application and tightening stages and $I_A$ is the shutdown motor current at the end of the application and tightening stages.

In this case too, the plots of FIGS. 5 and 6 apply the motor current merely replacing the bolting torque as the ordinate of FIG. 5.

I claim:

1. In a power-wrench bolting spindle comprising:
   (a) a drive shaft and an output shaft which is axially displaceable with respect to the drive shaft against a spring force, the improvement comprising:
   (b) a depth sensor comprising means for measuring the depth of bolting wherein:
       (b1) a transmitting end of the drive shaft delivering the torque is supported in axially displaceable manner within a receiving end of the output shaft receiving the torque; and
       (b2) a coil is mounted within a sleeve of the bolting spindle enclosing at least part of said drive shaft and of said receiving end, said receiving end being displaceable within said coil and concurrently changing inductance of said coil, said change in inductance generating a signal indicative of said depth of bolting.

2. The power-wrench with a bolting spindle of claim 1, wherein at least two length-measuring instruments are mounted to a base plate to which said bolting spindle is assembled and next to at least two sides of said bolting spindle, said length-measuring instruments positioned parallel with said depth sensor and having means for measuring the distance(s) between the base plate and a workpiece on which a bolting process is being carried out.

3. The power-wrench with a bolting spindle of claim 1, having in combination the following features:
(a) a motor;
(b) a torque sensor mounted between said motor and said drive shaft for said spindle;
(c) a regulating circuit for a bolting process;
(d) an angular-speed sensor connected to said regulating circuit for measurement of motor or spindle angular speed;
(e) an electronic memory storing parameters of said bolting spindle, its drive and said sensors, and mounted within said power-wrench; and
(f) said memory connected through said torque sensor to said regulating circuit.

4. The power-wrench with a bolting spindle of claim 1, having in combination the following features:
(a) a motor with a reduction gear;
(b) a torque sensor mounted between said motor and said drive shaft for said spindle;
(c) a regulating circuit for a bolting process;
(d) an angular-speed sensor connected to said regulating circuit for measurement of motor or spindle angular speed;
(e) an electronic memory storing parameters of said bolting spindle, its drive and said sensors, and mounted within said power-wrench; and
(f) said memory connected through said torque sensor to said regulating circuit.

5. The power-wrench of claim 4, having in combination the following features:
(g) said torque sensor comprising two strain gauges connected as a bridge circuit with arms;
(h) the magnitude of the electrical resistance of one of said bridge arms being arbitrarily variable by means of an electronic switch so that a control signal generated by said bridge and fed to said regulating circuit for the purpose of transmitting setting data is changed thereby; and
(i) a pulse train driving said electronic switch obtained from said memory reacting to clock pulses fed to it.

6. The power-wrench of claim 5, wherein said electronic switch is a transistor.

7. The power-wrench of claim 6, wherein a fixed resistor is placed in parallel with said transistor.

8. The power-wrench of claim 4, having in combination the following features:
(g) said torque sensor comprising four strain gauges connected as a bridge circuit;
(h) the magnitude of the electrical resistance of one of said bridge arms being arbitrarily variable by means of an electronic switch so that a control signal generated by said bridge and fed to said regulating circuit for the purpose of transmitting setting data is changed thereby; and
(i) a pulse train driving said switch obtained from said memory reacting to clock pulses fed to it.

9. The power-wrench of claim 8, wherein said electronic switch is a transistor.

10. The power-wrench of claim 9, wherein a fixed resistor is placed in parallel with said transistor.

11. A process for operating a power-wrench with bolting spindle in a bolting process having:
(a) a drive shaft and an output shaft which is axially displaceable with respect to the drive shaft against a spring force;
(b) a depth sensor comprising means for measuring the depth of bolting wherein:
(b1) a transmitting end of the drive shaft delivering the torque is supported in axially displaceable manner within a receiving end of the output shaft receiving the torque; and
(b2) a coil is mounted within a sleeve of the bolting spindle enclosing at least part of said drive shaft and of said receiving end, said receiving end being displaceable within said coil and concurrently changing inductance of said coil, said change in inductance generating a signal indicative of said depth of bolting.
(c) a motor in operative connection with said drive shaft;
(d) a torque sensor mounted between said motor and said drive shaft for said spindle;
(e) a regulating circuit for said process;
(f) an angular-speed sensor connected to said regulating circuit for measurement of motor or spindle angular speed;
(g) an electronic memory storing parameters of said bolting spindle, its drive and said sensors and mounted within said power-wrench;
(h) said memory connected through said torque sensor to said regulating circuit;
wherein said bolting method is carried out in two operational stages, an application stage and a tightening stage which are separated by a pause, each stage terminating when a shutdown bolting torque ($M_{AL}$, $M_{AZ}$) or a shutdown motor current ($I_{AL}$, $I_{AZ}$) that is predetermined for them has been reached, wherein in said application stage the bolting angular speed n is controlled by said depth sensor to be lowered from its initial value as it approaches said application stage wherein a screw head or a nut touches a base to a final value (shutdown bolting angular speed $n_{AL}$) which stops, upon reaching the shutdown bolting torque ($M_{AL}$) or the shutdown motor current ($I_{AL}$) respectively, the power-wrench while averting overloading.

12. The process of claim 11, wherein said motor is combined with reduction gears.

13. The process of claim 11, wherein said bolting angular speed n is regulated by the formula below while said bolting torque M is continuously measured:

$$n = n_{max} - [n_{max} - n_{min}] \times M/M_A,$$

where $n_{max}$ is the maximum bolting angular speed in the application or the tightening stage, $n_{min}$ is the minimum bolting angular speed in the application or tightening stage, and $M_A$ is the shutdown bolting torque at the end of the application or the tightening stage.

14. The process of claim 11, whrerein said angular speed n is regulated by the formula below while said motor current I is continuously measured:

$$n = n_{max} - [n_{max} - n_{min}] \times I/I_A,$$

where $n_{max}$ is the maximum bolting angular speed in the application or the tightening stage, $n_{min}$ is the minimum bolting angular speed in the application or the tightening stage, and $I_A$ is the shutdown motor current at the end of the application or the tightening stage.

* * * * *